US012584010B2

(12) United States Patent (10) Patent No.: US 12,584,010 B2

Guerra et al. (45) Date of Patent: Mar. 24, 2026

---

(54) BUTENE-1 POLYMER COMPOSITIONS HAVING A SHORT CRYSTALLIZATION TIME

(71) Applicant: Basell Poliolefine Italia S.r.l., Milan (IT)

(72) Inventors: Silvia Guerra, Ferrara (IT); Roberta Marchini, Ferrara (IT); Stefano Spataro, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 590 days.

(21) Appl. No.: 18/018,491

(22) PCT Filed: Jul. 28, 2021

(86) PCT No.: PCT/EP2021/071127

§ 371 (c)(1),
(2) Date: Jan. 27, 2023

(87) PCT Pub. No.: WO2022/023408

PCT Pub. Date: Feb. 3, 2022

(65) Prior Publication Data

US 2023/0287203 A1 Sep. 14, 2023

(30) Foreign Application Priority Data

Jul. 31, 2020 (EP) ..................................... 20188872

(51) Int. Cl.
| | |
|---|---|
| *C08L 23/20* | (2025.01) |
| *C08K 3/36* | (2006.01) |
| *C08L 23/06* | (2006.01) |
| *C08K 3/34* | (2006.01) |

(52) U.S. Cl.
CPC ................ *C08L 23/20* (2013.01); *C08K 3/36* (2013.01); *C08L 23/06* (2013.01); *C08K 3/346* (2013.01); *C08K 2201/003* (2013.01); *C08L 2203/18* (2013.01)

(58) Field of Classification Search
None
See application file for complete search history.

(56) References Cited

U.S. PATENT DOCUMENTS

| | | | | |
|---|---|---|---|---|
| 3,468,862 | A | * | 9/1969 | Schotland ............... C08L 23/20 |
| | | | | 264/28 |
| 4,298,718 | A | | 11/1981 | Mayr et al. |
| 4,495,338 | A | | 1/1985 | Mayr et al. |
| 4,746,692 | A | | 5/1988 | Hayden |
| 5,925,587 | A | | 7/1999 | Lee et al. |
| 2004/0204552 | A1 | | 10/2004 | Minami et al. |
| 2010/0233399 | A1 | | 9/2010 | Pradella et al. |
| 2011/0245404 | A1 | * | 10/2011 | Masarati ................. C08L 23/20 |
| | | | | 264/322 |

FOREIGN PATENT DOCUMENTS

| | | | |
|---|---|---|---|
| JP | H10265215 | A * | 10/1998 |
| JP | 2002256124 | A | 9/2002 |
| JP | 2002371162 | A | 12/2002 |
| JP | 2007186563 | A | 7/2007 |
| JP | 2009520093 | A | 5/2009 |
| JP | 2016194060 | A | 11/2016 |
| WO | 9945043 | A1 | 9/1999 |
| WO | 03042258 | A1 | 5/2003 |
| WO | 2004048424 | A1 | 6/2004 |
| WO | 2012011576 | A1 | 1/2012 |
| WO | 2015093450 | A1 | 6/2015 |

OTHER PUBLICATIONS

The International Search Report and The Written Opinion for PCT/EP2021/071127 mailed Nov. 22, 2021.
H. Nathani et al., On the Reduced Susceptibility to Stress Whitening Behavior of Melt Intercalated Polybutene-Clay Nanocomposites During Tensile Straining, Acta Materialia., vol. 52, No. 11, Jun. 1, 2004, pp. 3217-3227, XP055769663, GB ISSN:1359-6454, DOI:10. 1016/j.actamat.2004.03.021.

* cited by examiner

*Primary Examiner* — Richard A. Huhn

(57) ABSTRACT

A butene-1 polymer composition made from or containing:
A) from 97.5% to 99.85% by weight, with respect to the total weight of A) and B), of a butene-1 polymer or polymer composition;
B) from 0.15% to 2.5% by weight, with respect to the total weight of A) and B), of talc in form of particles having a volume-based particle diameter distribution Dv (0.95) of 45 μm or lower; and, optionally
C) from 0.01% to 2% by weight of an ethylene polymer, wherein the amount of C) being referred to the total weight of A)+B)+C), amounts to 100%.

11 Claims, No Drawings

BUTENE-1 POLYMER COMPOSITIONS HAVING A SHORT CRYSTALLIZATION TIME

This application is the U.S. National Phase of PCT International Application PCT/EP2021/071127, filed Jul. 28, 2021, claiming benefit of priority to European Patent Application No. 20188872.4, filed Jul. 31, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to butene-1 polymer compositions.

BACKGROUND OF THE INVENTION

Butene-1 polymers are used in a wide range of applications. In some instances, crystalline butene-1 homopolymers and copolymers display properties of pressure resistance, creep resistance, and impact strength, such that pipes made therefrom are used as replacements for metal pipes.

In some instances, a combination of flexibility and tensile strength permits the use of crystalline butene-1 homopolymers and copolymers in pipe applications.

In some instances, the crystallization time of butene-1 polymers affects extrusion speeds in the pipe-molding process and affects processing speeds for molding processes.

In some instances, nucleating agents affects the properties of polymers. In some instances, the nucleating agents are foreign materials that promote the crystallization of the polymer from the melt (heterogeneous nucleation).

It is noted that, in the field of nucleation of polyolefins, an effective nucleating agent for one polymer may be ineffective for a closely-related polymer, thereby hindering the identification of nucleating agents for a specific polymer. The challenge is more complicated for butene-1 polymers, which crystallize into at least two different crystalline forms.

SUMMARY OF THE INVENTION

In a general embodiment, the present disclosure provides a butene-1 polymer composition made from or containing:
  A) from 97.5% to 99.85% by weight, alternatively from 98% to 99.8% by weight, alternatively from 98% to 99.5% by weight, with respect to the total weight of A) and B), of a butene-1 polymer or polymer composition selected from crystalline butene-1 homopolymers, crystalline butene-1 copolymers, and combinations thereof;
  B) from 0.15% to 2.5% by weight, alternatively from 0.2% to 2% by weight, alternatively from 0.5% to 2% by weight, with respect to the total weight of A) and B), of talc in form of particles having a volume-based (volumetric) particle diameter distribution Dv (0.95) of 45 µm or lower, alternatively of 35 µm or lower, alternatively of 25 µm or lower, alternatively of 20 µm or lower, determined by laser light diffraction; and, optionally
  C) from 0.01% to 2% by weight, alternatively from 0.01% to 1% by weight, alternatively from 0.01% to 0.5% by weight, alternatively from 0.01% to 0.2% by weight, of an ethylene polymer,
wherein the amount of C) being referred to the total weight of A)+B)+C), amounts to 100%.

In some embodiments, the lower limit of the volume-based (volumetric) particle diameter distribution of the talc is 5 µm.

DETAILED DESCRIPTION OF THE INVENTION

In some embodiments, and as used herein, the term "crystalline butene-1 homopolymers and copolymers" refers to homopolymers and copolymers A) having a crystallization peak, corresponding to a crystallization temperature $T_c$, when subjected to differential scanning calorimetry (DSC) measurement.

In some embodiments, the butene-1 polymer composition, made from or containing components A), B) and optionally C), has a crystallization peak, corresponding to a crystallization temperature $T_c$, when subjected to DSC measurement.

In some embodiments, the $T_c$ value of the butene-1 polymer component A) is 75° C. or higher, alternatively in the range from 75° C. to 85° C.

In some embodiments, the $T_c$ value of the butene-1 polymer composition is 80° C. or higher, alternatively in the range from 80° C. to 90° C.

In some embodiments, the $T_c$ value of the butene-1 polymer composition is at least 2° C. higher, alternatively from 2° C. to 5° C. higher, than the $T_c$ value of the butene-1 polymer component A).

The crystallization temperatures are determined after a melting cycle, with a scanning speed of 10° C./minute.

It is believed that because the crystallization temperatures are measured in a cooling run carried out after first melting the polymer sample (using DSC), the crystallization temperatures are attributable to crystalline form II of the butene-1 polymer.

In some embodiments, more than one crystallization peak is detected and the temperature of the most intense peak is taken as the Tc value for both the butene-1 polymer component A) and the butene-1 polymer composition.

In some embodiments, the butene-1 polymer composition has a crystallization half-time at 90° C. of from 90 to 160 seconds, alternatively from 100 to 150 seconds.

Differential scanning calorimetry (DSC) is used to determine the crystallization half-time at 90° C. by first melting a sample, then rapidly cooling the sample to 90° C. and measuring the heat flow caused by the crystallization exotherm. The integral of heat transfer is recorded as a function of time until the crystallization is complete, that is, heat transfer ceases.

As used herein, the term "crystallization half-time" refers to the time at which the heat transfer integral reaches half of the time to crystallization's final value.

In some embodiments, the butene-1 polymer composition has one or more of the following additional features:
  a flexural modulus from 450 to 650 MPa, alternatively from 500 to 600 MPa, measured according to norm ISO 178:2019, 10 days after molding;
  a tensile elastic modulus from 500 to 800 MPa, alternatively from 560 to 750 MPa, measured at 23° C. via DMTA analysis according to ISO 6721-4:2019 on 1 mm thick compression-molded plaque;
  a value of Izod impact resistance at 23° C. from 3 to 15 kJ/m², alternatively from 3 to 10 kJ/m², measured according to ISO180:2000 on compressed plaques according to ISO 8986-2:2009; or
  a value of Izod impact resistance at 0° C. from 2 to 10 kJ/m², alternatively from 2 to 8 kJ/m², measured according to ISO180:2000 on compressed plaques according to ISO 8986-2:2009.

In some embodiments, the butene-1 homopolymers and copolymers A) are linear polymers having an isotacticity from 90 to 99%, alternatively from 95 to 99%, measured as mmmm pentads/total pentads, using NMR analysis, or as quantity by weight of matter soluble in xylene at 0° C.

In some embodiments, the butene-1 homopolymers and copolymers A) have one or more of the following features:
an X-ray crystallinity of from 50% to 60%; or
a density of from 0.90 to 0.94 g/cm³.

In some embodiments, the butene-1 homopolymers and copolymers A) and the butene-1 polymer composition, made from or containing components A), B), and optionally C), have a melting temperature (melting peak) from 90 to 125° C., alternatively from 100 to 125° C., measured with the DSC method during a second heating run, after first melting and cooling, with a scanning speed of 10° C./minute.

In some embodiments, the melting temperatures are believed to be attributable to crystalline form II of the butene-1 polymer.

In some embodiments, more than one melt peak is detected and the temperature of the most intense peak in is taken as the melting temperature.

In some embodiments, copolymers of butene-1 contain up to 5% by moles of olefinic comonomers, alternatively from 0.1% to 5% by moles, alternatively from 0.1% to 3% by moles. In some embodiments, the comonomers are selected from the group consisting of ethylene, propylene, and R—CH=CH₂ olefins where R is a C₃-C₈ alkyl or cycloalkyl radical. In some embodiments, R is selected from the group consisting of ethylene, propylene, and alpha-olefins containing from 5 to 8 carbon atoms. In some embodiments, alpha-olefins containing from 5 to 8 carbon atoms are selected from the group consisting of pentene-1, hexene-1, 4-methylpentene-1, and octene-1.

In some embodiments, the homopolymers and copolymers are obtained by low-pressure Ziegler-Natta polymerization of butene-1 or halogenated compounds of titanium supported on magnesium chloride, and a co-catalyst. In some embodiments, the polymerization involves polymerizing butene-1 (and any comonomers) with catalysts based on TiCl₃. In some embodiments, the halogenated compound of titanium is TiCl₄. In some embodiments, the co-catalyst is selected from the group consisting of alkyl compounds of aluminum. In some embodiments, electron-donor compounds are added to the catalyst components, thereby tailoring polymer properties, like molecular weights and isotacticity. In some embodiments, the electron-donor compounds are selected from the group consisting of esters of carboxylic acids and alkyl alkoxysilanes.

In some embodiments, the butene-1 homopolymers and copolymers A) are prepared by polymerization of the monomers in the presence of a stereospecific catalyst made from or containing (i) a solid component made from or containing a Ti compound and an internal electron-donor compound supported on MgCl₂; (ii) an alkylaluminum compound and, optionally, (iii) an external electron-donor compound.

In some embodiments, magnesium dichloride in active form is used as a support. In some embodiments, magnesium dichloride in active form is used as a support for Ziegler-Natta catalysts. In some embodiments, Ziegler-Natta catalysts supported on magnesium dichloride in active form are used in Ziegler-Natta catalysis as described in U.S. Pat. Nos. 4,298,718 and 4,495,338. In some embodiments, the magnesium dihalides in active form used as support or co-support in components of catalysts for the polymerization of olefins, are characterized by X-ray spectra wherein the most intense diffraction line that appears in the spectrum of the non-active halide is diminished in intensity and replaced by a halo having its maximum intensity displaced towards lower angles relative to that of the more intense line.

In some embodiments, the titanium compounds used in the catalyst component (i) are selected from the group consisting of TiCl₄, TiCl₃, and Ti-haloalcoholates of formula Ti(OR)$_{n-y}$X$_y$, where n is the valence of titanium, X is halogen, and y is a number between 1 and n. In some embodiments, the halogen is chlorine.

In some embodiments, the internal electron-donor compound is selected from the group consisting of esters. In some embodiments, the esters are selected from the group consisting of alkyl, cycloalkyl, or aryl esters of monocarboxylic acids or polycarboxylic acids, wherein the alkyl, cycloalkyl, or aryl groups having from 1 to 18 carbon atoms. In some embodiments, the monocarboxylic acids are benzoic acids. In some embodiments, the polycarboxylic acids are selected from the group consisting of phthalic acids, succinic acids, and glutaric acids. In some embodiments, the electron-donor compounds are selected from the group consisting of diisobutyl phthalate, diethylphtahalate, dihexylphthalate, diethyl 3,3-dimethyl glutarate, and diisobutyl 3,3-dimethyl glutarate. In some embodiments, the internal electron donor compound is used in molar ratio with respect to the MgCl₂ of from 0.01 to 1, alternatively from 0.05 to 0.5.

In some embodiments, the alkyl-Al compound (ii) is selected from the group consisting of trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the alkyl-Al compound (ii) is a mixture of trialkylaluminum compounds with alkylaluminum halides, alkylaluminum hydrides, or alkylaluminum sesquichlorides. In some embodiments, the alkylaluminum sesquichlorides are selected from the group consisting of AlEt₂Cl and Al₂Et₃Cl₃.

In some embodiments, the external donors (iii) are silicon compounds of formula R$_a$¹R$_b$²Si(OR³)$_c$, wherein a and b are integer from 0 to 2, c is an integer from 1 to 3, and the sum (a+b+c) is 4; and R¹, R², and R³ are alkyl, cycloalkyl or aryl radicals with 1-18 carbon atoms optionally containing heteroatoms. In some embodiments, a is 0, c is 3, b is 1, R² is a branched alkyl or cycloalkyl group, optionally containing heteroatoms, and R³ is methyl. In some embodiments, the silicon compounds are selected from the group consisting of cyclohexyltrimethoxysilane, t-butyltrimethoxysilane, diisopropyltrimethoxysilane, and thexyltrimethoxysilane. In some embodiments, the silicon compound is thexyltrimethoxysilane.

In some embodiments, the electron donor compound (iii) is used in an amount such that the molar ratio between the alkyl-Al compound (ii) and the electron donor compound (iii) is from 0.1 to 500, alternatively from 1 to 300, alternatively from 3 to 100.

In some embodiments, the catalyst is pre-polymerized in a pre-polymerization step. In some embodiments, the prepolymerization is carried out in liquid (slurry or solution) or in the gas-phase. In some embodiments, the prepolymerization is carried out at temperatures lower than 100° C., alternatively between 20 and 70° C. The prepolymerization step is carried out with quantities of monomers, thereby obtaining the polymer in amounts of between 0.5 and 2000 g per g of solid catalyst component, alternatively between 5 and 500 g, alternatively between 10 and 100 g.

In some embodiments, and as described in Patent Cooperation Treaty Publication No. WO 03/042258, the butene-1 polymers are prepared by polymerization in the presence of catalysts obtained by contacting a metallocene compound with an alumoxane.

In some embodiments, the polymerization process is carried out via slurry polymerization, using as diluent a liquid inert hydrocarbon, or solution polymerization. In some embodiments, the solution polymerization uses liquid butene-1 as a reaction medium. In some embodiments, the polymerization process is carried out in the gas-phase, operating in one or more fluidized or mechanically agitated bed reactors. In some embodiments, the polymerization is carried out in liquid butene-1 as a reaction medium.

In some embodiments, a molecular weight regulator is fed to the polymerization environment, thereby controlling the molecular weight. In some embodiments, the molecular weight regulator is hydrogen.

In some embodiments, the polymerization catalysts and processes are as described in Patent Cooperation Treaty Publication Nos. WO99/45043 and WO2004048424.

In some embodiments, the butene-1 homopolymers and copolymers A) and the butene-1 polymer composition have a MIE of from 100 to 0.01 g/10 min., alternatively from 10 to 0.1 g/10 min., where MIE is the melt flow index measured according to ISO 1133-2:2011, at 190° C./2.16 kg. In some embodiments, the butene-1 homopolymers and copolymers A) and the butene-1 polymer composition are used in the extrusion devices for the manufacture of pipes and the MIE in the range of from 1 to 0.1 g/10 min. In some embodiments, the values of MIE are obtained directly in polymerization or by subsequent chemical treatment (chemical visbreaking) of the polymer component(s).

The chemical visbreaking of the polymer is carried out in the presence of free radical initiators, such as the peroxides. In some embodiments, the radical initiators are selected from the group consisting of 2,5-dimethyl-2,5-di (tert-butylperoxide)-hexane and dicumyl-peroxide.

In some embodiments, the intrinsic viscosity values for the butene-1 homopolymers and copolymers A) are from 1.5 to 4 dl/g, as measured in decalin at 135° C.

In some embodiments, and for pipe applications, the molecular weight distribution (MWD) of the butene-1 homopolymers and copolymers A) is equal to higher than 4, alternatively equal to or higher than 5, when expressed in terms of $M_w/M_n$ (where $M_w$ is the weight average molecular weight and $M_n$ is the number average molecular weight), measured by GPC analysis.

In some embodiments, the upper limit of the Mw/Mn values is 9.

In some embodiments, $M_w/M_n$ values of greater than 5 amount to a "broad MWD."

In some embodiments, butene-1 polymers with a broad MWD are obtained by (co)polymerizing butene-1 with a catalyst capable of producing broad MWD polymers. In some embodiments, butene-1 polymers with a broad MWD are obtained by mechanically blending butene-1 polymers having different molecular weights.

In some embodiments, butene-1 polymers with a broad MWD are obtained by a multistep polymerization process, wherein butene-1 polymers with different molecular weights are prepared in sequence in two or more reactors with different reaction conditions. In some embodiments, the reaction conditions include controlling the concentration of molecular weight regulator fed in each reactor.

In some embodiments, talc component B) has one or more of the following volume-based particle diameter distribution features:

Dv (0.99) of 100 μm or lower, alternatively of 50 μm or lower, alternatively of 30 μm or lower;

Dv (0.90) of 20 μm or lower, alternatively of 15 μm of lower;

Dv (0.50) of 10 μm or lower, alternatively of 8 μm or lower; or

Dv (0.10) of 5 μm or lower, alternatively of 4 μm or lower. In some embodiments, the lower limit for Dv (0.99) is 10 μm. In some embodiments, the lower limit for Dv (0.90) is 3 μm. In some embodiments, the lower limit for Dv (0.50) is 2 μm. In some embodiments, the lower limit for Dv (0.10) is 1 μm.

As used herein, the "volume-based particle diameter" refers to the diameter of an equivalent sphere having the same volume as the subject particle.

As used herein, the values of volume-based particle diameter distribution refer to the volume fraction of particles having an equivalent diameter of less than a given value. For instance, 95% by volume refers to Dv (0.95)

In some embodiments, the determination is carried out by laser diffraction.

In some embodiments, the analytical equipment used is a Malvern Mastersizer instrument.

As used herein, talc refers to a hydrated magnesium silicate.

In some embodiments, talc has the formula $Mg_3Si_4O_{10}$ $(OH)_2$.

In some embodiments, the talc is hydrated magnesium silicate, optionally associated with other mineral materials, such as chlorite (hydrated magnesium aluminum silicate) and dolomite.

In some embodiments, the talc is milled, thereby achieving the particle diameter distribution. In some embodiments, the milling is a method selected from the group consisting of air classified mills, compressed air grinding, steam grinding, and impact grinding.

In some embodiments, component B) is free from chemical additives. In some embodiments, the chemical additives are acid acceptors. In some embodiments, the acid acceptors are stearates, alternatively metal stearates, alternatively Zn stearate.

In some embodiments, the ethylene polymer C) is selected from the group consisting of high density polyethylene HDPE, linear low density polyethylene LLDPE, and low density polyethylene LDPE, and mixtures thereof. In some embodiments, the high density polyethylene HDPE has a density from 0.940 to 0.965 g/cm³. In some embodiments, the linear low density polyethylene LLDPE has a density from 0.900 to 0.939 g/cm³. In some embodiments, the high density polyethylene HDPE and the linear low density polyethylene LLDPE are obtained by low pressure polymerization. In some embodiments, the low density polyethylene LDPE had a density from 0.917 to 0.935 g/cm³. In some embodiments, the low density polyethylene LDPE is obtained by high pressure polymerization. In some embodiments, the low pressure polymerization is carried out in the presence of the previously-described Ziegler-Natta catalysts. In some embodiments, the high pressure polymerization is carried out in the presence of radical initiators, such as peroxides.

In some embodiments, the HDPE is a homopolymer of ethylene or a copolymer of ethylene containing one or more olefin comonomers.

In some embodiments, the LLDPE is a copolymer of ethylene containing one or more olefin comonomers.

In some embodiments, the comonomer or comonomers in the HDPE and LLDPE are selected from olefins having formula $CH_2=CHR$, wherein R is an alkyl radical, linear or branched, having from 1 to 10 carbon atoms.

In some embodiments, the comonomers are selected from the group consisting of propylene, butene-1, pentene-1, 4-methylpentene-1, hexene-1, octene-1, and decene-1.

In some embodiments, the comonomer content in the HDPE is of 0.1-15% by weight, alternatively from 0.5 to 10% by weight, with respect to the total weight of the HDPE polymer.

In some embodiments, the comonomer content in the LLDPE is of 5-20% by weight, alternatively from 8 to 15% by weight, with respect to the total weight of the LLDPE polymer.

In some embodiments, the LDPE is a homopolymer of ethylene or a copolymer of ethylene containing smaller quantities of comonomers, such as butyl acrylate.

In some embodiments, the ethylene polymers C) are HDPE.

In some embodiments, the ethylene polymer C) has a MIF of from 1 to 50 g/10 min., alternatively from 5 to 50 g/10 min., alternatively from 10 to 40 g/10 min, where MIF is the melt flow index measured according to ISO 1133-2:2011, at 190° C./21.6 kg.

In some embodiments, the polybutene-1 composition is further made from or containing additives. In some embodiments, the additives are selected from the group consisting of stabilizers, antioxidants, anticorrosion agents, processing aids, pigments, organic fillers, and inorganic fillers.

In some embodiments, the polybutene-1 composition is obtained by blending components A), B), and optionally C).

In some embodiments, the blending uses an extruder or a mixer. In some embodiments, the extruder is selected from the group consisting of single-screw extruders and twin corotating screw extruders. In some embodiments, the mixers are continuous or batch mixers. In some embodiments, the blending apparatuses are equipped with separate feeding systems for component A), B), and C), respectively. In some embodiments, component B) and optionally component C) are added to the polymer mass inside the blending apparatus, alternatively the extruder, in the same feed port or downstream from the point at which A) is fed into the blending apparatus, wherein the distance between the feed port of A and the downstream feed port of components B) and C) allows component A) to reach the form of a melted, homogeneous mass.

In some embodiments, component B) is fed in the form of a masterbatch in a polymer carrier, alternatively in a polyolefin carrier, alternatively in a polybutene carrier of the same kind as the butene-1 polymer component A).

In some embodiments, components A), B) and optionally C) are premixed before the blending step. In some embodiments, the premixing step occurs in low speed mixers like single or double shaft paddle conveyors, ribbon blenders, or plough mixers.

In some embodiments, a static mixing device, such as SMX® static mixers from Sulzer, is used to prepare the final composition, wherein molten streams of components (A), (B), and (C) are fed into the mixing device's inlet and pushed through a twin or a single screw extruder using a gear pump.

In some embodiments, and during the blending step, the processing temperatures bring and keep component A) in the molten state when B) and optionally C) are added. In some embodiments, component A) was already in a molten state and, during the blending step, the processing temperatures keep component A) in the molten state when B) and optionally C) are added. In some embodiments, the processing temperatures range from 100° C. to 230° C., alternatively from 100 to 220° C., alternatively from 120 to 210° C.

In some embodiments, the polybutene-1 composition is used for making pipes and pipe joints. In some embodiments, the pipes are used for carrying water and hot fluids. In some embodiments, the present disclosure provides an article of manufacture made from the butene-1 polymer composition. In some embodiments, the article of manufacture is selected from the group consisting of pipes and pipe joints.

The following examples are illustrative and not intended to limit the scope of the present disclosure.

Particle Size Distribution

Particle size distribution (PSD) was measured by laser diffraction according to ISO 13320:2009.

The equipment used was a Mastersizer® 2000 with sample dispersion unit, from Malvern UK.

The detection system had the following features:

Red light: forward scattering, side scattering, back scattering;

Blue light: wide angle forward and back scattering;

Light sources: Red light He—Ne Laser; Blue light solid state light source;

Optical alignment system: Automatic rapid align system with dark field optical reticule;

Laser system: Class 1 laser product.

PSD determination was based on the optical diffraction principle of the laser monochromatic light scattered through a dispersed particulate sample. The signal was received by a computer interfaced to the instrument, for processing the received signals and converting the signals into dimensional physical quantities.

The results are expressed by a PSD report, consisting of 106 classes of diameter (virtual sieves) with related cumulative percentages in terms of volume and additional derived parameters.

The measurement data were contaminated by background electrical noise and by scattering data from dust on the optics and contaminants floating in the dispersant. To overcome these sources of contamination, the sample dispersion unit was cleaned and traces of impurities and residual material were removed.

Also, a background measurement with pure dispersant (solvent) was made, and a measurement of the electrical background was made. The total background value obtained was subtracted from the sample measurement, thereby obtaining the sample data.

For the background measurement, 250 cc. of anhydrous n-heptane solvent containing 2 g/l SPAN 80 Pure as antistatic agent were introduced into the sample dispersion unit. Air residual in solvent was removed by ultrasonic treatment (60 seconds) prior to each measurement.

The solvent was then sent to the measurement cell, while stirrer and recycle pump were operating at an output range of 2205 rpm.

Measurement

The sample, kept in suspension in anhydrous n-heptane by stirring, was added directly into the sample unit.

A 2-minute sample suspension recycling promoted disaggregation of aggregates (if present).

The obscuration bar was observed on a monitor, thereby managing the volume concentration of the sample. The concentration of sample corresponded to obscuration values ranging from 10% to 30%, thereby providing a representative and stable result.

The refractive index (RI) was set to:

Particle RI: 1.596;

Dispersant RI: 1.390.

The measurement time was 4 seconds.

The signals received from the laser equipment were processed. The PSD was then calculated by the software provided with the Mastersizer apparatus.

Crystallization and Melting Temperature

The crystallization temperature ($T_c$) and the melting temperature values were determined using the following procedure.

Differential scanning calorimetric (DSC) data were obtained using a Perkin Elmer DSC-7 instrument. A weighed sample (5-10 mg) was sealed into an aluminum pan and heated at 200° C. with a scanning speed corresponding to 10° C./minute. The sample was kept at 200° C. for 5 minutes, thereby melting the crystallites and cancelling the thermal history of the sample. Successively, by cooling to −20° C. with a scanning speed corresponding to 10° C./minute, the peak temperature was taken as crystallization temperature ($T_c$) and the area as the crystallization enthalpy. After standing 5 minutes at −20° C., the sample was heated for the second time to 200° C. with a scanning speed corresponding to 10° C./min. In this second heating run, the peak temperature was taken as the melting temperature of the polybutene-1 crystalline form II (TmII) and the area as the melting enthalpy (ΔHfII).

To determine the melting temperature of the polybutene-1 crystalline form I (TmI), the sample was melted, kept at 200° C. for 5 minutes, and then cooled down to 20° C. with a cooling rate of 10° C./min. The sample was then stored for 10 days at room temperature. After 10 days the sample was subjected to DSC. The sample was cooled to −20° C. and then heated at 200° C. with a scanning speed corresponding to 10° C./min. In this heating run, the first peak temperature coming from the lower temperature side in the thermogram was taken as the melting temperature (Tml).

Crystallization Half-Time at 90° C.

Differential scanning calorimetric (DSC) data were obtained using a Perkin Elmer DSC-7 instrument. A weighed sample (5-10 mg) was sealed into an aluminum pan and heated from room temperature to 180° C. with a scanning speed corresponding to 10° C./minute.

The sample was kept at 180° C. for 5 minutes, thereby melting the crystallites and cancelling the thermal history of the sample.

Successively, the sample was cooled to 90° C. with a scanning speed corresponding to 60° C./minute and the heat flow caused by the crystallization exotherm at 90° C. was measured. The integral of heat transfer was recorded as a function of time until the crystallization was complete, that is, heat transfer ceased.

As previously mentioned herein, the term "crystallization half-time" refers to the time at which the heat transfer integral reaches half of the time to crystallization's final value.

MIF and MIE

Determined according to ISO 1133-2:2011 at 190° C. with the specified load.

Intrinsic Viscosity

Determined according to norm ASTM D 2857-16 in tetrahydronaphthalene at 135° C.

Tensile Elastic Modulus (MET-DMTA)

Determined at 23° C. via Dynamic Mechanical Thermal Analysis (DMTA) according to ISO 6721-4:2019 on 1 mm thick compression molded plaque.

Flexural Modulus

According to norm ISO 178:2019, measured 10 days after molding.

Izod Impact Resistance at 23° C. and 0° C.

Measured according to ISO180:2000 on compressed plaques according to ISO 8986-2:2009.

Comonomer Contents

Determined by IR spectroscopy or by NMR.

For the butene-1 copolymers, the amount of comonomer was calculated from the 13C-NMR spectra of the copolymers.

The $^{13}$C NMR spectra were acquired on a Bruker AV-600 spectrometer equipped with cryo-probe, operating at 150.91 MHz in the Fourier transform mode at 120° C.

The peak of the $T_{\beta\delta}$ carbon (nomenclature according to C. J. Carman, R. A. Harrington and C. E. Wilkes, *Macromolecules*, 10, 3, 536 (1977)) was used as internal standard at 37.24 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD, thereby removing $^{1}$H-$^{13}$C coupling. About 512 transients were stored in 32K data points using a spectral window of 9000 Hz.

The assignments of the spectra, the evaluation of triad distribution and the composition are made according to Kakugo [M. Kakugo, Y. Naito, K. Mizunuma and T. Miyatake, *Macromolecules*, 16, 4, 1160 (1982)] and Randall [J. C. Randall, *Macromol. Chem Phys.*, C30, 211 (1989)] using the following:

$$BBB=100(T_{\beta\beta})/S=I5$$

$$BBE=100T_{\beta\delta}/S=I4$$

$$EBE=100P_{\delta\delta}/S=I14$$

$$BEB=100S_{\beta\beta}/S=I13$$

$$BEE=100S_{\alpha\delta}/S=I7$$

$$EEE=100(0.25S_{\gamma\delta}+0.5S_{\delta\delta})/S=0.25I9+0.5I10$$

Where $S=I5+I4+I14+I13+I7+0.25I9+0.5I10$

The total amount of 1 butene and ethylene as molar percent was calculated from triad using the following relations:

$$[E]=EEE+BEE+BEB$$

$$[B]=BBB+BBE+EBE$$

| Area | Chemical Shift | Assignments | Sequence |
|---|---|---|---|
| 1 | 40.40-40.14 | Sαα | BBBB |
| 2 | 39.64 | Tδδ | EBE |
| | 39-76-39.52 | Sαα | BBBE |
| 3 | 39.09 | Sαα | EBBE |
| 4 | 37.27 | Tβδ | BBE |
| 5 | 35.20-34.88 | Tββ | BBB |
| 6 | 34.88-34.49 | Sαγ | BBEB + BEBE |
| 7 | 34.49-34.00 | Sαδ | EBEE + BBEE |
| 8 | 30.91 | Sγγ | BEEB |
| 9 | 30.42 | Sγδ | BEEE |
| 10 | 29.90 | Sδδ | EEE |
| 11 | 27.73-26.84 | Sβδ + 2B$_2$ | BBB + BBE EBEE + BBEE |

-continued

| Area | Chemical Shift | Assignments | Sequence |
|------|----------------|-------------|----------|
| 12 | 26.70 | $2B_2$ | EBE |
| 13 | 24.54-24.24 | $S\beta\beta$ | BEB |
| 14 | 11.22 | $P\delta\delta$ | EBE |
| 15 | 11.05 | $P\beta\delta$ | BBE |
| 16 | 10.81 | $P\beta\beta$ | BBB |

Determination of Isotactic Pentads Content

The $^{13}$C NMR spectra were acquired on a polymer solution (8-12 wt %) in dideuterated 1,1,2,2-tetrachloroethane at 120° C. The 13C NMR spectra were acquired on a Bruker AV-600 spectrometer operating at 150.91 MHz in the Fourier transform mode at 120° C. equipped with cryo-probe, using a 90° pulse, 15 seconds of delay between pulses and CPD (WALTZ16) to remove $^1$H-$^{13}$C coupling. About 512 transients were stored in 32K data points using a spectral window of 60 ppm (0-60 ppm). The mmmm pentad peak (27.73 ppm) was used as the standard.

The assignments were made as described in the literature (Macromolecules 1991, 24, 2334-2340, by Asakura T.).

The percentage value of pentad tacticity (mmmm %) for butene-1 polymers is the percentage of stereoregular pentads (isotactic pentad) as calculated from the relevant pentad signals (peak areas) in the NMR region of branched methylene carbons as:

$$mmmm \% = 100 A1/(A1+A2)$$

where A1 was the area between 28.0 and 27.59 ppm;
A2 was the area between 27.59 and 26.52 ppm Fractions Soluble and Insoluble in Xylene at 0° C. (XS-0° C.)

2.5 g of the polymer sample were dissolved in 250 ml of xylene at 135° C. under agitation. After 30 minutes, the solution was allowed to cool to 100° C. Under agitation, the solution was placed in a water and ice bath to cool down to 0° C. Then, the solution was allowed to settle for 1 hour in the water and ice bath. The precipitate was filtered with filter paper. During the filtering, the flask was left in the water and ice bath, thereby keeping the flask inner temperature near 0° C. After the filtering, the filtrate temperature was balanced at 25° C., dipping the volumetric flask in a water-flowing bath for about 30 minutes and then, divided in two 50 ml aliquots. The solution aliquots were evaporated in nitrogen flow, and the residue dried under vacuum at 80° C. until a constant weight was reached. If the weight difference between the two residues was not lower than 3%, the test was repeated. The percent by weight of polymer soluble (Xylene Solubles at 0° C.=XS 0° C.) was calculated from the average weight of the residues. The insoluble fraction in o-xylene at 0° C. (xylene Insolubles at 0° C.=XI %0° C.) was:

$$XI \%0° C. = 100 - XS \%0° C.$$

Determination of X-Ray Crystallinity

The X-ray crystallinity was measured with an X-ray Diffraction Powder Diffractometer using the Cu-Kα1 radiation with fixed slits and collecting spectra between diffraction angle 2Θ=5° and 2Θ=35° with step of 0.1° per 6 seconds.

Measurements were performed on compression-molded specimens in the form of disks of about 1.5-2.5 mm of thickness and 2.5-4.0 cm of diameter. These specimens were obtained in a compression molding press at a temperature of 200° C.±5° C. without any appreciable applied pressure for 10 minutes, then applying a pressure of about 10 kg/cm' for about few second and repeating this last operation 3 times.

The diffraction pattern was used to derive the components for the degree of crystallinity by defining a linear baseline for the whole spectrum and calculating the total area (Ta), expressed in counts/sec·2Θ, between the spectrum profile and the baseline. Then an amorphous profile was defined, along the whole spectrum, that separates, according to the two phase model, the amorphous regions from the crystalline regions. The amorphous area (Aa), expressed in counts/sec·2Θ, was calculated as the area between the amorphous profile and the baseline; and the crystalline area (Ca), expressed in counts/sec·2Θ, was calculated as Ca=Ta−Aa.

The degree of crystallinity of the sample was then calculated according to the formula:

$$\% Cr = 100 \times Ca/Ta$$

Mw/Mn Determination by GPC

The determination of the means Mn and Mw, and Mw/Mn derived therefrom was carried out using a Waters GPCV 2000 apparatus, which was equipped with a column set of four PLgel Olexis mixed-gel (Polymer Laboratories) and an IR4 infrared detector (PolymerChar). The dimensions of the columns were 300×7.5 mm with particle size 13 μm. The mobile phase used was 1-2-4-trichlorobenzene (TCB) with a flow rate at 1.0 ml/min. The measurements were carried out at 150° C. Solution concentrations were 0.1 g/dl in TCB and 0.1 g/l of 2,6-di-tert-butyl-p-cresole were added, thereby preventing degradation. For GPC calculation, a universal calibration curve was obtained using 10 polystyrene (PS) standard samples supplied by Polymer Laboratories (peak molecular weights ranging from 580 to 8500000). A third order polynomial fit was used to interpolate the experimental data and obtain the calibration curve. Data acquisition and processing were done using Empower (Waters). The Mark-Houwink relationship was used to determine the molecular weight distribution and the relevant average molecular weights: the K values were $K_{PS}=1.21\times10^{-4}$ dL/g and $K_{PB}=1.78\times10^{-4}$ dL/g for PS and PB respectively, while the Mark-Houwink exponents α=0.706 for PS and α=0.725 for PB were used.

For butene-1/ethylene copolymers, the composition was assumed constant in the whole range of molecular weight and the K value of the Mark-Houwink relationship was calculated using a linear combination:

$$K_{EB} = x_E K_{PE} + x_P K_{PB}$$

where $K_{EB}$ was the constant of the copolymer, $K_{PE}$ (4.06× $10^{-4}$, dL/g) and $K_{PB}$ (1.78×10$^{-4}$ dl/g) were the constants of polyethylene and polybutene and $x_E$ and $x_B$ were the ethylene and the butene-1 weight % content. The Mark-Houwink exponents α=0.725 was used for the butene-1/ethylene copolymers.

Density

Determined according to norm ISO 1183-1:2019 at 23° C.

Examples 1 and 2 and Comparative Example 1

Materials Used in the Examples

PB-1: homopolymer of butene-1 having the features reported in Table 1.

Talc 1: talc having the volume-based particle diameter distribution reported in Table 2, free from additives, sold by Imi Fabi with trademark HM05.

Talc 2: zinc stearate coated talc for comparison purpose, having the volume-based particle diameter distribution reported in Table 2, sold by Imerys with trademark Mistron ZSC.

HDPE: ethylene polymer having density of 0.954 g/cm$^3$ and MIF of 24 g/10 min.

The materials were melt-blended in a Leistritz Micro 27 extruder with co-rotating twin screw, 27 mm screw diameter segmented, 40:1 L/D ratio, 500 rpm max screw speed.

The main extrusion parameters were:

Temperature: 200° C.;

Screw speed: 200 rpm;

Output: 15 kg/h.

The amounts of the components and the properties of the resulting final compositions are reported in Table 3.

TABLE 1

|  |  | PB-1 |
| --- | --- | --- |
| $T_c$ | ° C. | 80 |
| Tm II | ° C. | 116.9 |
| Tm I | ° C. | 128.8 |
| Mw/Mn |  | 6.5 |
| mmm pentads |  | 95.83 |
| X-ray crystallinity | % | 55 |
| Density | g/cm$^3$ | 0.9166 |
| Intrinsic viscosity | dl/g | 2.17 |
| MET at 23° C. via DMTA | MPa | 632 |
| Flexural Modulus | MPa | 510 |
| Izod at 23° C. | kJ/m$^2$ | 30.4 |
| Izod at 0° C. | kJ/m$^2$ | 12.6 |
| MIE | g/10 min. | 0.47 |

TABLE 2

| Talc |  | Talc 1 | Talc 2 |
| --- | --- | --- | --- |
| Dv (0.10) | μm | 3.27 | 3.06 |
| Dv (0.50) | μm | 6.25 | 7.41 |
| Dv (0.90) | μm | 11.70 | 25.01 |
| Dv (0.95) | μm | 13.70 | 59.75 |
| Dv (0.99) | μm | 17.79 | 180.73 |

TABLE 3

|  |  | Example No. | | |
| --- | --- | --- | --- | --- |
|  |  | 1 | 2 | Comp. 1 |
| PB-1 | % wt. | 98.8 | 98.75 | 98.75 |
| Talc 1 | % wt. | 1.2 | 1.2 | — |
| Talc 2 | % wt. | — | — | 1.2 |
| HDPE | % wt. | — | 0.05 | 0.05 |
| Properties |  |  |  |  |
| $T_c$ | ° C. | 85.4 | 84.7 | 82.9 |
| Tm II | ° C. | 116.9 | 118.0 | 116.7 |
| Tm I | ° C. | 130.7 | 131.7 | 129.8 |
| Crystallization half-time at 90° C. | seconds | 120 | 132 | 192 |
| MET at 23° C. via DMTA | Mpa | 580 | 650 | 550 |
| Flexural Modulus | Mpa | 590 | 566 | 544 |
| Izod at 23° C. | kJ/m$^2$ | 5 | 5.3 | 6.3 |
| Izod at 0° C. | kJ/m$^2$ | 3.2 | 3.5 | 3.5 |
| MIE | g/10 min | 0.78 | 0.75 | 0.75 |

What is claimed is:

1. A butene-1 polymer composition comprising:

A) from 97.5% to 99.85% by weight, with respect to the total weight of A) and B), of a butene-1 polymer or polymer composition selected from crystalline butene-1 homopolymers, crystalline butene-1 copolymers, and combinations thereof;

B) from 0.15% to 2.5% by weight, with respect to the total weight of A) and B), of talc in form of particles having a volume based particle diameter distribution Dv (0.95) of 45 μm or lower, determined by laser light diffraction; and, optionally C) from 0.01% to 2% by weight, of an ethylene polymer, wherein the amount of C) being referred to the total weight of A)+B)+C).

2. The butene-1 polymer composition of claim 1, wherein the talc B) additionally has one or more of the following volume-based particle diameter distribution features:

Dv (0.99) of 100 μm or lower;

Dv (0.90) of 20 μm or lower;

Dv (0.50) of 10 μm or lower; or

Dv (0.10) of 5 μm or lower.

3. The butene-1 polymer composition according to claim 1, having a crystallization temperature $T_c$ of 80° C. or higher, measured with a DSC method after a melting cycle, with a scanning speed of 10° C./minute.

4. The butene-1 polymer composition according to claim 1, having a melting temperature of from 90 to 125° C., measured with a DSC method during a second heating run, after first melting and cooling, with a scanning speed of 10° C./minute.

5. The butene-1 polymer composition according to claim 1, having MIE of from 100 to 0.01 g/10 min., where MIE is the melt flow index measured according to ISO 1133-2: 2011, at 190° C./2.16 kg.

6. The butene-1 polymer composition according to claim 1, having one or more of the following additional features:

a crystallization half-time at 90° C. of from 90 to 160 seconds;

a flexural modulus from 450 to 650 MPa, measured according to norm ISO 178:2019, 10 days after molding;

a tensile elastic modulus from 500 to 800 MPa, measured at 23° C. via DMTA analysis according to ISO 6721-4:2019 on 1 mm thick compression-molded plaque;

a value of Izod impact resistance at 23° C. from 3 to 15 kJ/m$^2$, measured according to ISO180:2000 on compressed plaques according to ISO 8986-2:2009; or a value of Izod impact resistance at 0° C. from 2 to 10 kJ/m$^2$, measured according to ISO180:2000 on compressed plaques according to ISO 8986-2:2009.

7. The butene-1 polymer composition according to claim 1, wherein the butene-1 polymer component A) has a crystallization temperature $T_c$ of 75° C. or higher, measured with a DSC method after a melting cycle, with a scanning speed of 10° C./minute.

8. The butene-1 polymer composition according to claim 1, wherein the butene-1 homopolymers and copolymers A) have an isotacticity from 90 to 99%, measured as mmmm pentads/total pentads, using NMR analysis.

9. The butene-1 polymer composition according to claim 1, wherein the ethylene polymer component C) is selected from the group consisting of HDPE, LLDPE, LDPE, and mixtures thereof.

10. An article of manufacture comprising the butene-1 polymer composition of claim 1.

11. The article of manufacture of claim 10 selected from the group consisting of pipes and pipe joints.

* * * * *